United States Patent
Thompson (10) Patent No.: US 11,623,398 B2
(45) Date of Patent: Apr. 11, 2023

(54) MULTI-LEVEL VAT FOR ADDITIVE MANUFACTURING

(71) Applicant: General Electric Company, Schenectady, NY (US)

(72) Inventor: Mary Kathryn Thompson, North Huntingdon, PA (US)

(73) Assignee: General Electric Company, Schenectady, NY (US)

( * ) Notice: Subject to any disclaimer, the term of this patent is extended or adjusted under 35 U.S.C. 154(b) by 274 days.

(21) Appl. No.: 17/022,849

(22) Filed: Sep. 16, 2020

(65) Prior Publication Data

US 2020/0406543 A1    Dec. 31, 2020

Related U.S. Application Data

(62) Division of application No. 15/881,153, filed on Jan. 26, 2018, now Pat. No. 10,821,669.

(51) Int. Cl.
| | |
|---|---|
| B29C 41/34 | (2006.01) |
| B29C 64/255 | (2017.01) |
| B29C 64/245 | (2017.01) |
| B29C 64/135 | (2017.01) |
| B29C 64/277 | (2017.01) |

(Continued)

(52) U.S. Cl.
CPC .......... *B29C 64/255* (2017.08); *B29C 64/124* (2017.08); *B29C 64/135* (2017.08); *B29C 64/171* (2017.08); *B29C 64/176* (2017.08); *B29C 64/241* (2017.08); *B29C 64/245* (2017.08); *B29C 64/264* (2017.08); *B29C 64/277* (2017.08); *B29C 64/35* (2017.08);

(Continued)

(58) Field of Classification Search
CPC ........ B08B 2203/02; B29C 2033/0005; B29C 64/171; B29C 64/176; B29C 64/241; B29C 64/245; B29C 64/264; B29C 64/268; B29C 64/35; B33Y 30/00
USPC .................... 425/174.4, 215, 216, 225, 470; 134/104.2, 104.4, 121
See application file for complete search history.

(56) References Cited

U.S. PATENT DOCUMENTS

| | | |
|---|---|---|
| 4,575,330 A | 3/1986 | Hull |
| 4,752,498 A | 6/1988 | Fudim |

(Continued)

FOREIGN PATENT DOCUMENTS

| | | | |
|---|---|---|---|
| DE | 102007010624 A1 * | 9/2008 | ............. B33Y 30/00 |
| EP | 2505341 | 10/2012 | |

(Continued)

OTHER PUBLICATIONS

Translation of DE 102007010624 A1 (published on Sep. 4, 2008).*

(Continued)

*Primary Examiner* — Leo B Tentoni
(74) *Attorney, Agent, or Firm* — Dinsmore & Shohl LLP (57) ABSTRACT

An additive manufacturing apparatus includes a vat with multiple chambers and at least one of the chambers is a resin chamber configured to receive a radiant-energy-curable resin. A build surface is defined by the resin chamber within the vat, wherein at least a portion of the build surface is transparent. The additive manufacturing apparatus includes a stage that is positioned facing the vat and the build surface and the stage is configured to hold a stacked arrangement of one or more cured layers of the radiant-energy-curable resin.

11 Claims, 7 Drawing Sheets

(51) Int. Cl.
  *B29C 64/124* (2017.01)
  *B29C 64/35* (2017.01)
  *B29C 64/264* (2017.01)
  *B29C 64/171* (2017.01)
  *B29C 64/176* (2017.01)
  *B29C 64/241* (2017.01)
  B29C 64/268 (2017.01)
  B33Y 10/00 (2015.01)
  B33Y 30/00 (2015.01)
  B29C 33/00 (2006.01)

(52) U.S. Cl.
  CPC .... *B29C 64/268* (2017.08); *B29C 2033/0005* (2013.01); *B33Y 10/00* (2014.12); *B33Y 30/00* (2014.12)

(56) References Cited

U.S. PATENT DOCUMENTS

| | | |
|---|---|---|
| 5,026,146 A | 6/1991 | Hug et al. |
| 5,031,120 A | 7/1991 | Pomerantz et al. |
| 5,088,047 A | 2/1992 | Bynum |
| 5,096,530 A | 3/1992 | Cohen |
| 5,104,592 A | 4/1992 | Hull et al. |
| 5,126,529 A | 6/1992 | Weiss et al. |
| 5,143,663 A | 9/1992 | Leyden et al. |
| 5,171,490 A | 12/1992 | Fudim |
| 5,174,931 A | 12/1992 | Almquist et al. |
| 5,182,055 A | 1/1993 | Allison et al. |
| 5,192,559 A | 3/1993 | Hull et al. |
| 5,203,944 A | 4/1993 | Prinz et al. |
| 5,204,055 A | 4/1993 | Sachs et al. |
| 5,207,371 A | 5/1993 | Prinz et al. |
| 5,258,146 A | 11/1993 | Almquist et al. |
| 5,340,656 A | 8/1994 | Sachs et al. |
| 5,352,405 A | 10/1994 | Beaman et al. |
| 5,387,380 A | 2/1995 | Cima et al. |
| 5,432,045 A | 7/1995 | Narukawa et al. |
| 5,447,822 A | 9/1995 | Hull et al. |
| 5,454,069 A | 9/1995 | Knapp et al. |
| 5,496,682 A | 3/1996 | Quadir et al. |
| 5,573,721 A | 11/1996 | Gillette |
| 5,626,919 A | 5/1997 | Chapman et al. |
| 5,650,260 A | 7/1997 | Onishi |
| 5,660,621 A | 8/1997 | Bredt |
| 5,665,401 A | 9/1997 | Serbin et al. |
| 5,697,043 A | 12/1997 | Baskaran et al. |
| 5,718,279 A | 2/1998 | Saoth et al. |
| 5,807,437 A | 9/1998 | Sachs et al. |
| 5,851,465 A | 12/1998 | Bredt |
| 5,940,674 A | 8/1999 | Sachs et al. |
| 5,985,204 A | 11/1999 | Otsuka et al. |
| 6,051,179 A | 4/2000 | Hagenau |
| 6,146,567 A | 11/2000 | Sachs et al. |
| 6,193,923 B1 | 2/2001 | Leyden et al. |
| 6,200,646 B1 | 3/2001 | Neckers et al. |
| 6,206,672 B1 | 3/2001 | Grenda |
| 6,363,606 B1 | 4/2002 | Johnson et al. |
| 6,376,148 B1 | 4/2002 | Liu et al. |
| 6,401,002 B1 | 6/2002 | Jang et al. |
| 6,403,002 B1 | 6/2002 | van der Geest |
| 6,436,520 B1 | 8/2002 | Yamamoto |
| 6,471,800 B2 | 10/2002 | Jang et al. |
| 6,500,378 B1 | 12/2002 | Smith |
| 6,596,224 B1 | 7/2003 | Sachs et al. |
| 6,780,368 B2 | 8/2004 | Liu et al. |
| 6,838,035 B1 | 1/2005 | Ederer et al. |
| 6,850,334 B1 | 2/2005 | Gothait |
| 6,896,839 B2 | 5/2005 | Kubo et al. |
| 6,930,144 B2 | 8/2005 | Oriakhi |
| 6,966,960 B2 | 11/2005 | Boyd et al. |
| 6,986,654 B2 | 1/2006 | Imiolek et al. |
| 7,008,209 B2 | 3/2006 | Iskra et al. |
| 7,034,246 B2 | 4/2006 | Muylaert et al. |
| 7,052,263 B2 | 5/2006 | John |
| 7,087,109 B2 | 8/2006 | Bredr et al. |
| 7,195,472 B2 | 3/2007 | John |
| 7,270,528 B2 | 9/2007 | Sherwood |
| 7,300,613 B2 | 11/2007 | Sano et al. |
| 7,455,804 B2 | 11/2008 | Patel et al. |
| 7,520,740 B2 | 4/2009 | Wahlstrom et al. |
| 7,550,518 B2 | 6/2009 | Bredt et al. |
| 7,578,958 B2 | 8/2009 | Patel et al. |
| 7,614,866 B2 | 11/2009 | Sperry et al. |
| 7,636,610 B2 | 12/2009 | Schillen et al. |
| 7,767,132 B2 | 8/2010 | Patel et al. |
| 7,783,371 B2 | 8/2010 | John et al. |
| 7,785,093 B2 | 8/2010 | Holmboe et al. |
| 7,790,093 B2 | 9/2010 | Shkolnik et al. |
| 7,795,349 B2 | 9/2010 | Bredt et al. |
| 7,815,826 B2 | 10/2010 | Serdy et al. |
| 7,867,302 B2 | 1/2011 | Nevoret et al. |
| 7,892,474 B2 | 2/2011 | Shkolnik et al. |
| 7,894,921 B2 | 2/2011 | John et al. |
| 7,896,639 B2 | 3/2011 | Kritchman et al. |
| 7,946,840 B2 | 5/2011 | Perret et al. |
| 7,959,847 B2 | 6/2011 | Wicker et al. |
| 8,003,040 B2 | 8/2011 | El-Siblani |
| 8,071,055 B2 | 9/2011 | Davidson et al. |
| 8,110,135 B2 | 2/2012 | El-Siblani |
| 8,126,580 B2 | 2/2012 | El-Siblani et al. |
| 8,157,908 B2 | 4/2012 | Williams |
| 8,185,229 B2 | 5/2012 | Davidson |
| 8,096,262 B2 | 6/2012 | Ederer et al. |
| 8,211,226 B2 | 7/2012 | Bredt et al. |
| 8,326,024 B2 | 12/2012 | Shkolnik et al. |
| 8,444,903 B2 | 5/2013 | Lyons et al. |
| 8,475,946 B1 | 7/2013 | Dion et al. |
| 8,506,862 B2 | 8/2013 | Giller et al. |
| 8,506,870 B2 | 8/2013 | Hochsmann et al. |
| 8,568,649 B1 | 10/2013 | Balistreri et al. |
| 8,616,872 B2 | 12/2013 | Matsui et al. |
| 8,623,264 B2 | 1/2014 | Rohner et al. |
| 8,636,494 B2 | 1/2014 | Gothait et al. |
| 8,636,496 B2 | 1/2014 | Das et al. |
| 8,666,142 B2 | 3/2014 | Shkolnik et al. |
| 8,715,832 B2 | 5/2014 | Ederer et al. |
| 8,741,194 B1 | 6/2014 | Ederer et al. |
| 8,741,203 B2 | 6/2014 | Liska et al. |
| 8,761,918 B2 | 6/2014 | Silverbrook |
| 8,801,418 B2 | 8/2014 | El-Siblani et al. |
| 8,815,143 B2 | 8/2014 | John et al. |
| 8,844,133 B2 | 9/2014 | Fuller |
| 8,845,316 B2 | 9/2014 | Schillen et al. |
| 8,845,953 B1 | 9/2014 | Balistreri et al. |
| 8,876,513 B2 | 11/2014 | Lim et al. |
| 8,915,728 B2 | 12/2014 | Mironets et al. |
| 8,926,304 B1 | 1/2015 | Chen |
| 8,926,879 B2 | 1/2015 | Vagt et al. |
| 8,932,511 B2 | 1/2015 | Napadensky |
| 8,968,625 B2 | 3/2015 | Tan |
| 8,991,211 B1 | 3/2015 | Arlotti et al. |
| 8,998,601 B2 | 4/2015 | Busato |
| 9,067,359 B2 | 6/2015 | Rohner et al. |
| 9,079,357 B2 | 7/2015 | Ebert et al. |
| 9,101,321 B1 | 8/2015 | Kiesser |
| 9,120,270 B2 | 9/2015 | Chen et al. |
| 9,149,989 B2 | 10/2015 | Uckelmann |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,233,504 B2 | 1/2016 | Douglas et al. |
| 9,248,600 B2 | 2/2016 | Goodman et al. |
| 9,259,880 B2 | 2/2016 | Chen |
| 9,327,385 B2 | 5/2016 | Webb et al. |
| 9,360,757 B2 | 6/2016 | DeSimone et al. |
| 9,364,848 B2 | 6/2016 | Silverbrook |
| 9,403,322 B2 | 8/2016 | Das et al. |
| 9,403,324 B2 | 8/2016 | Ederer et al. |
| 9,415,544 B2 | 8/2016 | Kerekes et al. |
| 9,429,104 B2 | 8/2016 | Fuller |
| 9,434,107 B2 | 9/2016 | Zenere |
| 9,453,142 B2 | 9/2016 | Rolland et al. |
| 9,456,884 B2 | 10/2016 | Ucelmann et al. |

(56) References Cited

U.S. PATENT DOCUMENTS

| | | |
|---|---|---|
| 9,463,488 B2 | 10/2016 | Ederer et al. |
| 9,469,074 B2 | 10/2016 | Ederer et al. |
| 9,487,443 B2 | 11/2016 | Watanabe |
| 9,498,920 B2 | 11/2016 | DeSimone et al. |
| 9,511,546 B2 | 12/2016 | Chen et al. |
| 9,517,591 B2 | 12/2016 | Yoo et al. |
| 9,517,592 B2 | 12/2016 | Yoo et al. |
| 9,527,244 B2 | 12/2016 | El-Siblani |
| 9,529,371 B2 | 12/2016 | Nakamura |
| 9,533,450 B2 | 1/2017 | El-Siblani et al. |
| 9,539,762 B2 | 1/2017 | Durand et al. |
| 9,545,753 B2 | 1/2017 | Costabeber |
| 9,555,584 B2 | 1/2017 | Costabeber |
| 9,561,622 B2 | 2/2017 | Das et al. |
| 9,561,623 B2 | 2/2017 | El-Siblani et al. |
| 9,578,695 B2 | 2/2017 | Jerby et al. |
| 9,579,852 B2 | 2/2017 | Okamoto |
| 9,592,635 B2 | 3/2017 | Ebert et al. |
| 9,604,411 B2 | 3/2017 | Rogren |
| 9,632,420 B2 | 4/2017 | Allanic |
| 9,632,983 B2 | 4/2017 | Ueda et al. |
| 9,636,873 B2 | 5/2017 | Joyce |
| 9,649,812 B2 | 5/2017 | Hartmann et al. |
| 9,649,815 B2 | 5/2017 | Atwood et al. |
| 9,670,371 B2 | 6/2017 | Pervan et al. |
| 9,676,143 B2 | 6/2017 | Kashani-Shirazi |
| 9,676,963 B2 | 6/2017 | Rolland et al. |
| 9,682,166 B2 | 6/2017 | Watanabe |
| 9,682,425 B2 | 6/2017 | Xu et al. |
| 2008/0170112 A1 | 7/2008 | Hull et al. |
| 2010/0003619 A1 | 1/2010 | Das et al. |
| 2011/0310370 A1 | 12/2011 | Rohner et al. |
| 2012/0195994 A1 | 8/2012 | El-Siblani et al. |
| 2014/0084517 A1 | 3/2014 | Sperry et al. |
| 2014/0103581 A1 | 4/2014 | Das et al. |
| 2014/0227382 A1 | 8/2014 | Liska et al. |
| 2014/0275317 A1 | 9/2014 | Moussa |
| 2014/0319735 A1 | 10/2014 | El-Siblani et al. |
| 2014/0322374 A1 | 10/2014 | El-Siblani et al. |
| 2015/0102531 A1 | 4/2015 | El-Siblani et al. |
| 2015/0102532 A1 | 4/2015 | DeSimone et al. |
| 2015/0140152 A1 | 5/2015 | Chen |
| 2015/0145174 A1 | 5/2015 | Comb |
| 2015/0165695 A1 | 6/2015 | Chen et al. |
| 2015/0183168 A1 | 7/2015 | Liverman et al. |
| 2015/0210012 A1 | 7/2015 | Zenere |
| 2015/0224710 A1 | 8/2015 | El-Siblani |
| 2015/0246487 A1 | 9/2015 | El-Siblani |
| 2015/0355553 A1 | 12/2015 | Allanic |
| 2016/0031010 A1 | 2/2016 | O'Neill et al. |
| 2016/0046075 A1 | 2/2016 | DeSimone et al. |
| 2016/0059485 A1 | 3/2016 | Ding et al. |
| 2016/0096332 A1 | 4/2016 | Chen et al. |
| 2016/0107387 A1 | 4/2016 | Ooba et al. |
| 2016/0129631 A1 | 5/2016 | Chen et al. |
| 2016/0166359 A1 | 6/2016 | Flach et al. |
| 2016/0193785 A1 | 7/2016 | Bell et al. |
| 2016/0214327 A1 | 7/2016 | Uckelmann et al. |
| 2016/0221262 A1 | 8/2016 | Das et al. |
| 2016/0297141 A1 | 10/2016 | El-Siblani et al. |
| 2016/0332386 A1 | 11/2016 | Kuijpers |
| 2016/0361872 A1 | 12/2016 | El-Siblani |
| 2016/0368050 A1 | 12/2016 | Morris et al. |
| 2017/0001377 A1 | 1/2017 | Meisner et al. |
| 2017/0008234 A1 | 1/2017 | Cullen et al. |
| 2017/0008236 A1 | 1/2017 | Easter et al. |
| 2017/0028472 A1 | 2/2017 | Shaw et al. |
| 2017/0057177 A1 | 3/2017 | Ferguson et al. |
| 2017/0057178 A1 | 3/2017 | FrantzDale et al. |
| 2017/0066196 A1 | 3/2017 | Beard et al. |
| 2017/0072635 A1 | 3/2017 | El-Siblani et al. |
| 2017/0100891 A1 | 4/2017 | Meisner et al. |
| 2017/0100893 A1 | 4/2017 | Meisner et al. |
| 2017/0100895 A1 | 4/2017 | Chou et al. |
| 2017/0100897 A1 | 4/2017 | Chou et al. |
| 2017/0100899 A1 | 4/2017 | El-Siblani |
| 2017/0102679 A1 | 4/2017 | Greene et al. |
| 2017/0113409 A1 | 4/2017 | Patrov |
| 2017/0120332 A1 | 5/2017 | DeMuth et al. |
| 2017/0120333 A1 | 5/2017 | DeMuth et al. |
| 2017/0120334 A1 | 5/2017 | DeMuth et al. |
| 2017/0120335 A1 | 5/2017 | DeMuth et al. |
| 2017/0120336 A1 | 5/2017 | DeMuth et al. |
| 2017/0120387 A1 | 5/2017 | DeMuth et al. |
| 2017/0120518 A1 | 5/2017 | DeMuth et al. |
| 2017/0120529 A1 | 5/2017 | DeMuth et al. |
| 2017/0120530 A1 | 5/2017 | DeMuth et al. |
| 2017/0120537 A1 | 5/2017 | DeMuth et al. |
| 2017/0120538 A1 | 5/2017 | DeMuth et al. |
| 2017/0123222 A1 | 5/2017 | DeMuth et al. |
| 2017/0123237 A1 | 5/2017 | DeMuth et al. |
| 2017/0136688 A1 | 5/2017 | Knecht et al. |
| 2017/0136708 A1 | 5/2017 | Das et al. |
| 2017/0165916 A1 | 6/2017 | El Siblani |
| 2017/0173865 A1 | 6/2017 | Dikovsky et al. |
| 2017/0182708 A1 | 6/2017 | Lin et al. |
| 2017/0190120 A1 | 7/2017 | Bloome et al. |
| 2017/0197363 A1 | 7/2017 | FrantzDale |
| 2017/0266876 A1 | 9/2017 | Hocker |
| 2017/0266880 A1 | 9/2017 | Matsubara |
| 2017/0266888 A1* | 9/2017 | Pang ............... B29C 64/245 |
| 2017/0266890 A1 | 9/2017 | Volk |
| 2017/0291804 A1 | 10/2017 | Craft et al. |
| 2017/0297108 A1 | 10/2017 | Gibson et al. |
| 2017/0297109 A1 | 10/2017 | Gibson et al. |

FOREIGN PATENT DOCUMENTS

| | | |
|---|---|---|
| JP | 61114817 | 6/1986 |
| JP | 61114818 | 6/1986 |
| JP | 61116322 | 6/1986 |
| JP | H0499203 | 3/1992 |
| WO | 9806560 | 2/1998 |
| WO | 2006077665 | 7/2006 |
| WO | 201045950 | 4/2010 |
| WO | 201709368 | 1/2017 |
| WO | 2017091913 | 6/2017 |

OTHER PUBLICATIONS

Nussbaum et al., Evaluation of Processing Variables in Large Area Polymer Sintering of Single Layer Components, Solid Freeform Fabrication 2016: Proceedings of the 27th Annual International Solid Freeform Fabracation Symposium—An Additive Manufacturing Conference Reviewed Paper, University of South Florida, Tampa, Florida, US.

Matthews et al., Diode-Based Additive Manufacturing of Metals Using an Optically-Addressable Light Valve, Optic Express Research Article, May 10, 2017, vol. 25, No. 10, Lawrence Livermore National Laboratory, Livermore, California, US.

Lee et al., Large-Area Compatible Laser Sintering Schemes with a Spatially Extended Focused Beam, www.mdpi.com/journal/micromachinesm, Article May 11, 2017, Micromachines, Seoul University, Seoul, Korea.

International Preliminary Report on Patentability issued in connection with related International Patent Application No. PCT/US2019/012711 dated Jul. 28, 2020.

Extended European Search Report for EP Application No. 19744461.5 dated Sep. 17, 2021 (9 pages).

* cited by examiner

MULTI-LEVEL VAT FOR ADDITIVE MANUFACTURING

CROSS-REFERENCE TO RELATED APPLICATION

This application is a divisional application of U.S. Pat. No. 10,821,669, filed Jan. 26, 2018, for "Method For Producing A Component Layer-By-Layer," which is hereby incorporated by reference in its entirety including the drawings.

BACKGROUND OF THE INVENTION

This invention relates generally to additive manufacturing, and more particularly to methods for curable material handling in additive manufacturing.

Additive manufacturing is a process in which material is built up piece-by-piece, line-by-line, or layer-by-layer to form a component. Stereolithography is a type of additive manufacturing process which employs a vat of liquid radiant-energy curable photopolymer "resin" and a curing energy source such as a laser. Similarly, DLP 3D printing employs a two-dimensional image projector to build components one layer at a time. For each layer, the projector flashes a radiation image of the cross-section of the component on the surface of the liquid or through a transparent object which defines a constrained surface of the resin. Exposure to the radiation cures and solidifies the pattern in the resin and joins it to a previously-cured layer or to another build surface.

In curing the photopolymer resin, it is preferable to have a clean supply of material for each layer. Old resin may contain cured products such as supports that have broken off of the part or other external contamination. In a vat-based process, this contamination or the contaminated material can cure into the component, resulting in undesirable geometry, or otherwise disrupt the build process and damage the final part.

BRIEF DESCRIPTION OF THE INVENTION

According to one aspect of the technology described herein, an additive manufacturing apparatus that includes a vat. The vat includes multiple chambers and at least one of the chambers is a resin chamber that is configured to receive a radiant-energy-curable resin. A build surface is defined by the resin chamber within the vat, wherein at least a portion of the build surface is transparent. The additive manufacturing apparatus includes a stage that is positioned facing the vat and the build surface and the stage is configured to hold a stacked arrangement of one or more cured layers of the radiant-energy-curable resin. A method is provided for operating the additive manufacturing apparatus such that successive chambers of resin are cured. While a chamber of resin is being cured, another chamber can participate in other steps such as unloading or loading of resin. Optionally a stage cleaning step can be conducted while an unloading or loading of resin is conducted in one of the resin chambers.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
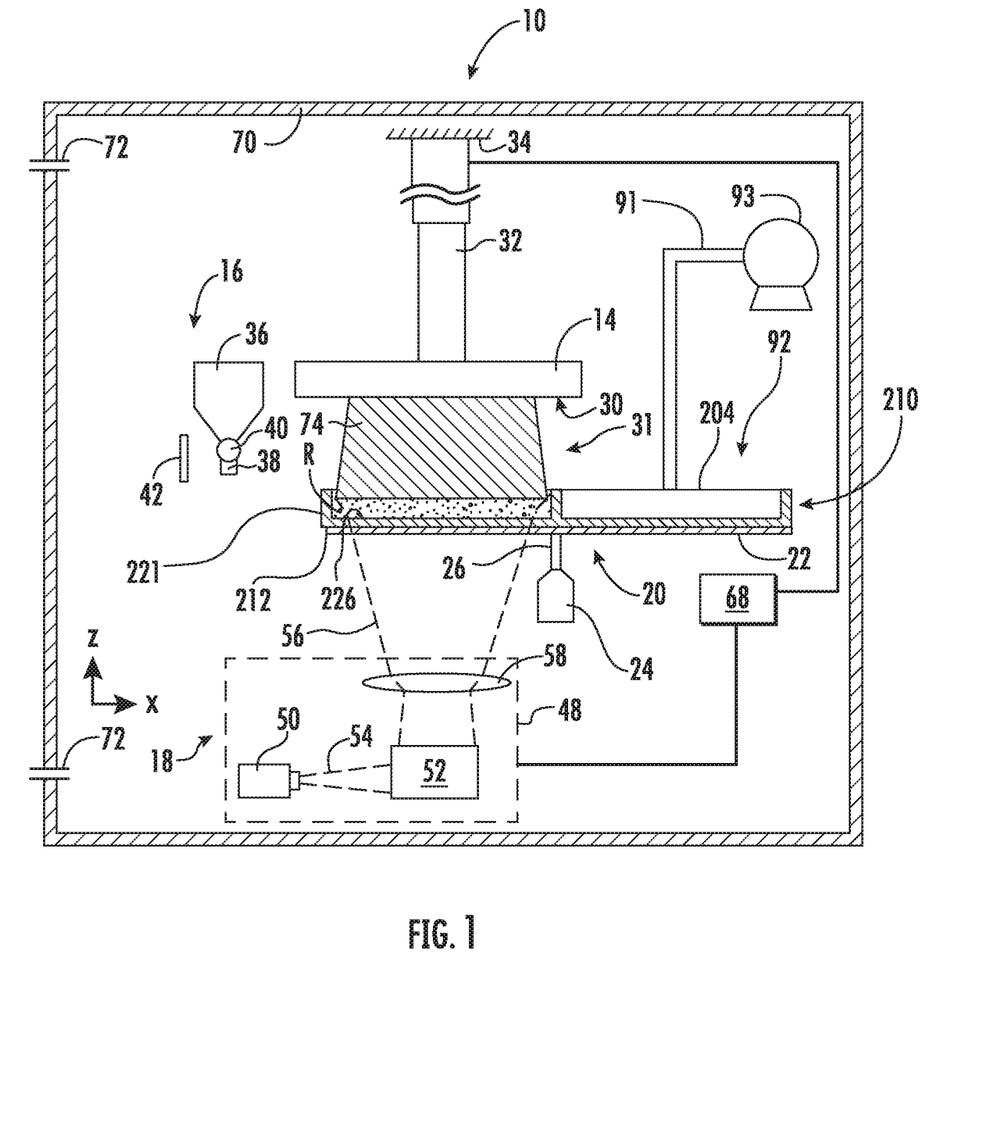
FIG. 1 is a schematic side elevation view of an exemplary additive manufacturing apparatus.

Referring to the drawings wherein identical reference numerals denote the same elements throughout the various views, FIG. 1 illustrates schematically an example of one type of suitable apparatus 10 for carrying out an additive manufacturing method for forming a component 74 from a resin R as described herein. As will be explained in more detail below, it will be understood that other configurations of equipment may be used to carry out the method described herein. The exemplary apparatus 10 includes a vat 210 that is configured to isolate debris that could contaminate the build from usable resin R. Other basic components are a stage 14, a material depositor 16, a radiant energy apparatus 18, and a turntable 20. Each of these components will be described in more detail below.

Figure 4:
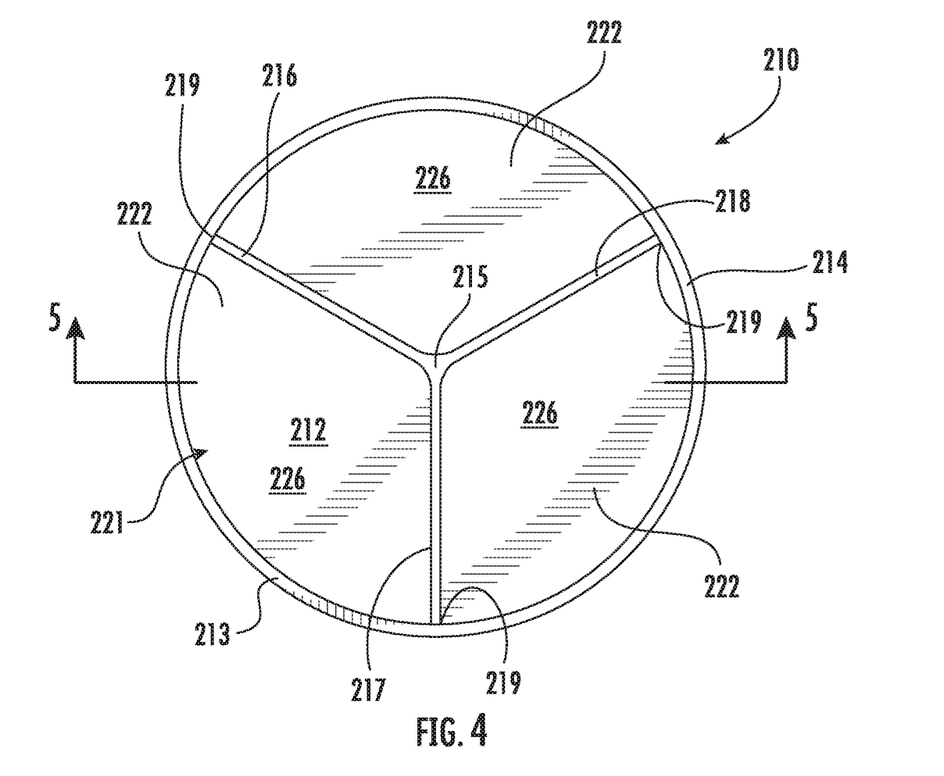
FIG. 4 is a view of a vat.
Figure 5:
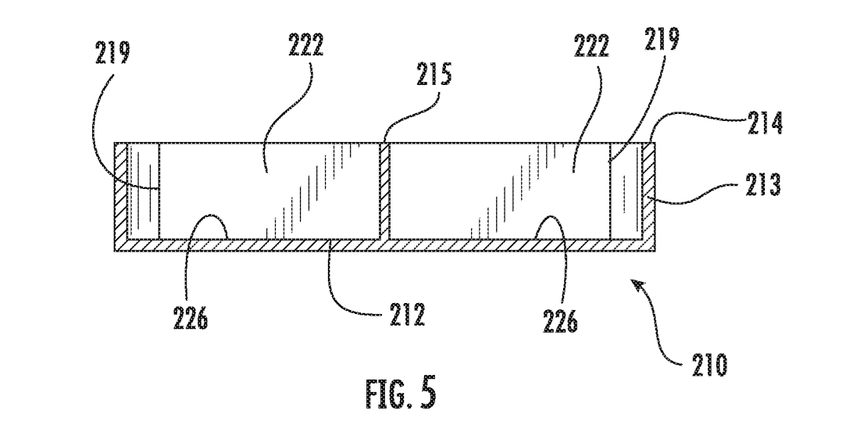
FIG. 5 is a sectional view of the vat of FIG. 4 taken along line 5-5.

Referring now to FIGS. 4 and 5, the vat 210 is generally circular and includes a floor 212 and a perimeter wall 213. The perimeter wall 213 extends from the floor 212 to a top edge 214. Inner surfaces of the floor 212 and the perimeter wall 213 define a receptacle 221 for receiving the radiant-energy-curable resin R. The receptacle 221 is separated into three chambers 222 by three dividing walls 216, 217, and 218. As shown in FIG. 4, each of the dividing walls 216, 217, and 218 intersect the peripheral wall 213 at a different one of three intersection locations 219 and extend to a center post 215. The walls 216, 217, and 218 extend from the floor 212 to the level of the top edge 214 of the perimeter wall 213. In this manner each chamber 222 is fluidly isolated from other chambers 222 when the level of the resin R is below the top 214 of the perimeter wall 213.

The floor 212 defines a build surface 226 within each of the chambers 222. For purposes of convenient description, each build surface 226 may be considered to be oriented parallel to an X-Y plane of the apparatus 10, and a direction perpendicular to the X-Y plane is denoted as a Z-direction (X, Y, and Z being three mutually perpendicular directions).

The build surfaces 226 may be configured to be "non-stick", that is, resistant to adhesion of cured resin. The non-stick properties may be embodied by a combination of variables such as the chemistry of the floor 212, its surface finish, and/or applied coatings. In one example, a permanent or semi-permanent non-stick coating may be applied. One non-limiting example of a suitable coating is polytetrafluoroethylene ("PTFE"). In one example, all or portions of the build surfaces 226 of vat 210 may incorporate a controlled roughness or surface texture (e.g. protrusions, dimples, grooves, ridges, etc.) with nonstick properties. In one example, the floor 212 may be made in whole or in part from an oxygen-permeable material.

The vat 210, or selected portions of it, are transparent. As used herein, "transparent" refers to a material which allows radiant energy of a selected wavelength to pass through. For example, as described below, the radiant energy used for curing could be ultraviolet light or laser light in the visible spectrum. Nonlimiting examples of transparent materials include polymers, glass, and crystalline minerals such as sapphire or quartz. The vat 210 could be made up of two or more subcomponents, at least some of which are transparent.

Referring again to FIG. 1, the stage 14 is a structure defining a planar upper surface 30 which is capable of being oriented parallel to the build surfaces 226 during the layer orientation and curing steps described below.

Figure 3:
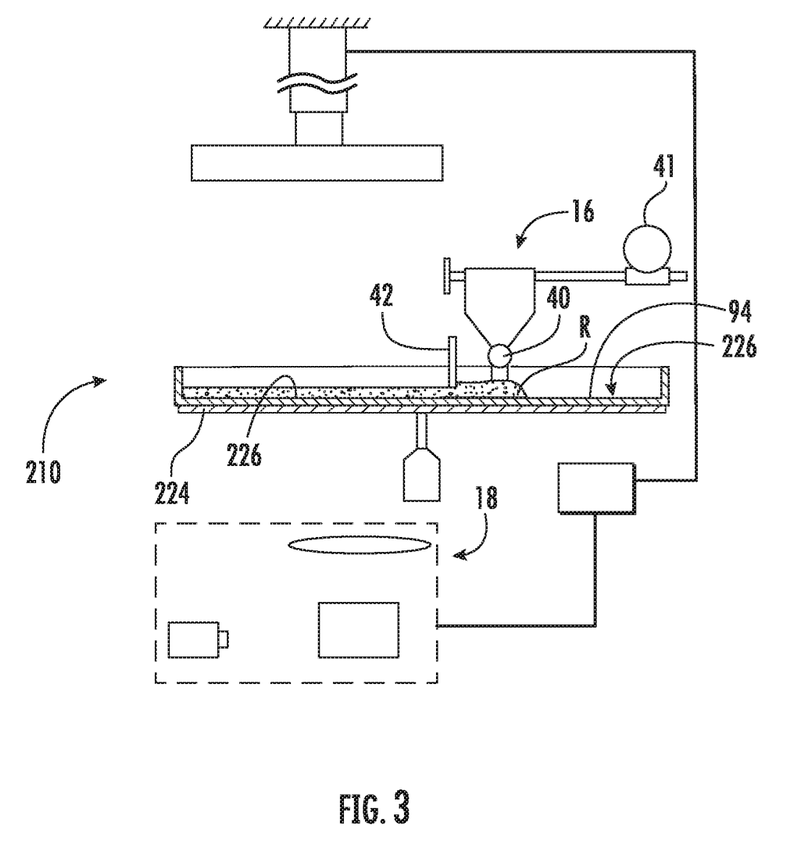
FIG. 3 is a view of the apparatus of FIG. 1, showing resin being deposited into a chamber of a vat.

Collectively, at least one of the chambers 222 together with the radiant energy apparatus 18 define a "build zone" 31. Another chamber 222 and an unloader 91 define an unload zone 92. Another chamber 222 and the material depositor 16 can define a fill or load zone 94 as shown in FIG. 3. The turntable 20 is operable to rotate such that a chamber 222 can move between the build zone 31, and the unload zone 92, and the load zone 94 as described further below. Optionally, a vat 210 can include more than three chambers 222. In such configurations generally one chamber 222 would be positioned in the build zone 31, one chamber 222 would be positioned in the unload zone 92, one chamber 222 would be positioned in the load zone 94, and any remaining chambers would be outside of the build zone 31, the unload zone 92, and the load zone 94. However, in some configurations multiple chambers 222 could be positioned within one or all of the build zone 31, the unload zone 92, and the load zone 94. For example, multiple chambers 222 could be filled simultaneously and the turntable 20 could be rotating as filling was occurring.

Some means are provided for moving the vat 210 relative to the stage 14 parallel to the Z-direction. In FIG. 1, these means are depicted schematically as a simple actuator 32 connected between the stage 14 and a stationary support structure 34, with the understanding devices such as pneumatic cylinders, hydraulic cylinders, ballscrew electric actuators, linear electric actuators, or delta drives may be used for this purpose. In addition to or as an alternative to making the stage 14 movable, the vat 210 could be movable parallel to the Z-direction.

The material depositor 16 may be any device or combination of devices which is operable to introduce a layer of resin R into the chamber 222 that is positioned within the fill zone. The material depositor 16 may optionally include a device or combination of devices to define a height in the resin and/or to level the resin R. Nonlimiting examples of suitable material deposition devices include chutes, hoppers, pumps, spray nozzles, spray bars, or printheads (e.g. inkjets).

In the example shown in FIG. 1, the material depositor 16 comprises a supply container 36 with a nozzle 38 and a valve 40. Means may be provided for mixing the resin R to ensure the material is homogenous. Appropriate means are provided for moving the material depositor 16 over a selected one of the build surfaces 226 such as the actuator 41 seen in FIG. 3, to deposit resin R.

The radiant energy apparatus 18 may comprise any device or combination of devices operable to generate and project radiant energy on the resin R in a suitable pattern and with a suitable energy level and other operating characteristics to cure the resin R during the build process, described in more detail below.

In one exemplary embodiment as shown in FIG. 1, the radiant energy apparatus 18 may comprise a projector 48, used herein generally to refer to any device operable to generate a radiant energy patterned image of suitable energy level and other operating characteristics to cure the resin R. As used herein, the term "patterned image" refers to a projection of radiant energy comprising an array of individual pixels. Nonlimiting examples of patterned imaged devices include a DLP projector or another digital micromirror device, a 2D array of LEDs, a 2D array of lasers, or optically addressed light valves. In the illustrated example, the projector 48 comprises a radiant energy source 50 such as a UV lamp, an image forming apparatus 52 operable to receive a source beam 54 from the radiant energy source 50 and generate a patterned image 56 to be projected onto the surface of the resin R, and optionally focusing optics 58, such as one or more lenses.

The radiant energy source 50 may comprise any device operable to generate a beam of suitable energy level and frequency characteristics to cure the resin R. In the illustrated example, the radiant energy source 50 comprises a UV flash lamp.

The image forming apparatus 52 may include one or more mirrors, prisms, and/or lenses and is provided with suitable actuators, and arranged so that the source beam 54 from the radiant energy source 50 can be transformed into a pixelated image in an X-Y plane coincident with the surface of the resin R. In the illustrated example, the image forming apparatus 10 may be a digital micromirror device. For example, the projector 48 may be a commercially-available Digital Light Processing ("DLP") projector.

As an option, the projector 48 may incorporate additional means such as actuators, mirrors, etc. configured to selectively move the image forming apparatus 52 or other parts of the projector 48, with the effect of rastering or shifting the location of the patterned image 56 on the build surface 226. Stated another way, the patterned image 56 may be moved away from a nominal or starting location. This permits a single image forming apparatus 52 to be used to project images appropriate to each given layer. For example, to cover a larger build area or to better align the edges of subsequent layers. Means for rastering or shifting the patterned image from the image forming apparatus 52 are commercially available. This type of image projection may be referred to herein as a "tiled image".

Figure 2:
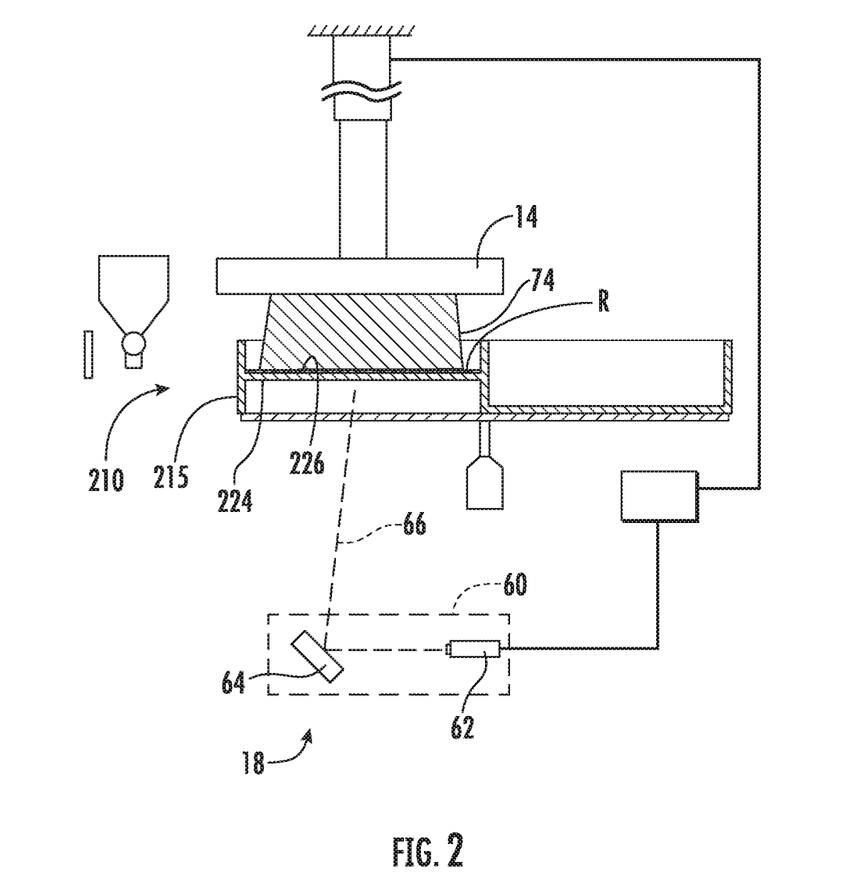
FIG. 2 is a schematic side elevation view of an alternative additive manufacturing apparatus.

In another exemplary embodiment as shown in FIG. 2, the radiant energy apparatus 18 may comprise a "scanned beam apparatus" 60 used herein to refer generally to refer to any device operable to generate a radiant energy beam 66 of suitable energy level and other operating characteristics to cure the resin R and to scan the beam 66 over the surface of the resin R in a desired pattern. In the illustrated example, the scanned beam apparatus 60 comprises a radiant energy source 62 and a beam steering apparatus 64.

The radiant energy source 62 may comprise any device operable to generate a beam of suitable power and other operating characteristics to cure the resin R. Nonlimiting examples of suitable radiant energy sources include lasers or electron beam guns.

The beam steering apparatus 10 may include one or more mirrors, prisms, and/or lenses and may be provided with suitable actuators, and arranged so that the beam 66 from the radiant energy source 62 can be focused to a desired spot size and steered to a desired position in plane coincident with the surface of the resin R. The beam 66 may be referred to herein as a "build beam". Other types of scanned beam apparatus may be used. For example, scanned beam sources using multiple build beams are known, as are scanned beam sources in which the radiant energy source itself is movable by way of one or more actuators.

The turntable 20 is configured to rotate the vat 210 such that at least a portion of the vat 210 is within the build zone 31. The turntable 20 includes a platter 22 that is configured to receive the vat 210. The platter 22 is sufficiently transparent such that radiant energy can pass through it to cure the resin R. The platter 22 is mechanically linked to a motor 24 by a shaft 26. The motor 26 is configured to move such that the platter 22 rotates. In this manner, the vat 210 can be rotated beneath the stage 14 such that a curing chamber 222 can be positioned in the build zone 31 or removed from the build zone 31 as will be discussed further below.

The apparatus 10 may include a controller 68. The controller 68 in FIG. 1 is a generalized representation of the hardware and software required to control the operation of the apparatus 10, including some or all of the material depositor 16, the stage 14, the radiant energy apparatus 18, the turntable 20, and the various actuators described above. The controller 68 may be embodied, for example, by software running on one or more processors embodied in one or more devices such as a programmable logic controller ("PLC") or a microcomputer. Such processors may be coupled to sensors and operating components, for example, through wired or wireless connections. The same processor or processors may be used to retrieve and analyze sensor data, for statistical analysis, and for feedback control.

Optionally, the components of the apparatus 10 may be surrounded by a housing 70, which may be used to provide a shielding or inert gas atmosphere using gas ports 72. Optionally, pressure within the enclosure could be maintained at a desired level greater than or less than atmospheric. Optionally, the enclosure 70 could be temperature and/or humidity controlled. Optionally, ventilation of the enclosure 70 could be controlled based on factors such as a time interval, temperature, humidity, and/or chemical species concentration.

The resin R comprises a material which is radiant-energy curable and which is capable of adhering or binding together the filler (if used) in the cured state. As used herein, the term "radiant-energy curable" refers to any material which solidifies in response to the application of radiant energy of a particular frequency and energy level. For example, the resin R may comprise a known type of photopolymer resin containing photo-initiator compounds functioning to trigger a polymerization reaction, causing the resin to change from a liquid state to a solid state. Alternatively, the resin R may comprise a material which contains a solvent that may be evaporated out by the application of radiant energy.

Generally, the resin R should be flowable so that it can be leveled within the vat 210. The composition of the resin R may be selected as desired to suit a particular application. Mixtures of different compositions may be used. A suitable resin R can have a lower viscosity such that it flows easily and is quickly self-leveling. It should be appreciated that the resin R can be filled.

The resin R may be selected to have the ability to out-gas or burn off during further processing, such as the sintering process described below.

If a filler is used, it may be pre-mixed with resin R, then loaded into the material depositor 16. The filler comprises particles, which are conventionally defined as "a very small bit of matter". The filler may comprise any material which is chemically and physically compatible with the selected resin R. The particles may be regular or irregular in shape, may be uniform or non-uniform in size, and may have variable aspect ratios. For example, the particles may take the form of powder, of small spheres or granules, or may be shaped like small rods or fibers.

The composition of the filler, including its chemistry and microstructure, may be selected as desired to suit a particular application. For example, the filler may be metallic, ceramic, polymeric, and/or organic. Other examples of potential fillers include diamond, silicon, and graphite. Mixtures of different compositions may be used.

The filler may be "fusible", meaning it is capable of consolidation into a mass upon via application of sufficient energy. For example, fusibility is a characteristic of many available polymeric, ceramic, glass, and metallic powders.

The proportion of filler to resin R may be selected to suit a particular application. Generally, any amount of filler may be used so long as the combined material is capable of flowing and being leveled, and there is sufficient resin R to hold together the particles of the filler in the cured state.

Examples of the operation of the apparatus 10 will now be described in detail. It will be understood that, as a precursor to producing a component and using the apparatus 10, the component 74 is software modeled as a stack of planar layers arrayed along the Z-axis. Depending on the type of curing method used, each layer may be divided into a grid of pixels. The actual component 74 may be modeled and/or manufactured as a stack of dozens or hundreds of layers. Suitable software modeling processes are known in the art.

The material depositor 16 can be used to fill a selected one of the chambers 222 of the vat 210 with the curable resin R. Alternatively, multiple chambers 222 can be filled in this step. In the example shown in FIG. 3, the valve 40 is open and resin flows into the selected chamber 222 as the material depositor 16 translates laterally above the vat 210, and the recoater 42 levels the resin R. Optionally, the resin R is allowed to self-level. This filling step is used when beginning a build or when such resin R has been consumed that refilling is required. The resin R added in a filling step can be recovered resin R that has been filtered.

After the material is deposited, i.e., at least one chamber 222 is filled, the turntable 20 is operated to move the filled chamber from the load zone 94 to the build zone 31. Alternatively, multiple chambers 222 can be moved into the build zone 31 such that resin contained within the multiple chambers 222 can be simultaneously exposed to curing energy. A curing step is executed as follows: the apparatus 10 is positioned to define a selected layer increment within the chamber 222. The layer increment is defined by some combination of the thickness of the resin R that is applied by the material depositor 16, or the operation of the stage 14, or some combination thereof. For example, the stage 14 could be positioned such that the upper surface 30 is just touching the applied resin R. The layer increment affects the speed of the additive manufacturing process and the resolution of the component 74. The layer increment can be variable, with a larger layer increment being used to speed the process in portions of a component 74 not requiring high accuracy, and a smaller layer increment being used where higher accuracy is required, at the expense of process speed.

Once the layer increment has been defined, the radiant energy apparatus 18 is used to cure a cross-section or layer of the component 74 being built. In this manner a first cured layer is created. A second cured layer, a third cured layer and additional cured layers can be created through the operational steps described below.

Where a projector 48 is used, the projector 48 projects a patterned image 56 representative of a cross-section of the component 74 through the floor 212 of the vat 210 to the resin R. Exposure to the radiant energy cures and solidifies the pattern in the resin R. This type of curing is referred to herein as "selective" curing. It will be understood that photopolymers undergo degrees of curing. In many cases, the radiant energy apparatus 18 would not fully cure the resin R. Rather, it would partially cure the resin R enough to "gel" and then a post-cure process (described below) would cure the resin R to whatever completeness it can reach. It will also be understood that, when a multi-layer component is made using this type of resin R, the energy output of the radiant energy apparatus 18 may be carefully selected to partially cure or "under-cure" a previous layer, with the expectation that when the subsequent layer is applied, the energy from that next layer will further the curing of the previous layer. In the process described herein, the term "curing" or "cured" may be used to refer to partially-cured or completely-cured resin R. During the curing process, radiant energy may be supplied to a given layer in multiple steps (e.g. multiple flashes) and also may be supplied in multiple different patterns for a given layer. This allows different amounts of energy to be applied to different parts of a layer.

Once curing of the first layer is complete, the stage 14 is separated from the vat 210, for example by raising the stage 14 using the actuator 32. It is noted that stage 14 and the vat 210 do not necessarily have to remain parallel during the separation procedure. For example, the vat 210 could rotate (e.g. using of a pinned joint or a flexure) or through small-scale deformations of the vat 210. This flexing or rotation could be helpful in separating cured resin from the vat 210.

Conventional alignment means (pins, guides, etc.—not shown) may be provided to ensure repeatable positioning of the vat 210 within the build zone and/or in a loading or cleaning area outside of the build zone 31.

Where a scanned beam apparatus is used instead of a projector, the radiant energy source 68 emits a beam 66 and the beam steering apparatus 70 is used to cure the resin R by steering a focal spot of the build beam 66 over the exposed resin R in an appropriate pattern. The radiant energy source 68 again emits a build beam 66 and the beam steering apparatus 70 is used to steer the focal spot of the build beam 66 over the exposed resin R in an appropriate pattern. The exposed layer of the resin R is exposed to the radiant energy which selectively cures resin R as described above, and joins it to the previously-cured layer above. This cycle of incrementing a layer, applying resin R, and then selectively curing is repeated until the entire workpiece 74 is complete.

Optionally, a scanned beam apparatus may be used in combination with a projector. For example, a scanned beam apparatus may be used to apply radiant energy (in addition to that applied by the projector) by scanning one or multiple beams over the build surface 26. This may be concurrent or sequential with the use of the projector.

The accuracy of either process, defined as the smallest component feature size which can be produced, is limited mainly by the resolution of the projector 48 or the scanned beam apparatus 60. The accuracy is also influenced by the optical properties of the resin including how deeply light may penetrate and how light is scattered, which can be a function of the amount of filler used and the properties of the filler.

Any of the curing methods described above results in a component 74 in which the filler (if used) is held in a solid shape by the cured resin R. This component may be usable as an end product for some conditions. Subsequent to the curing step, the component 74 may be removed from the stage 14.

If the end product is intended to be composed of the filler (e.g. to be purely ceramic, glass, metallic, diamond, silicon, graphite, etc., the component 74 may be treated to a conventional sintering process to burn out the resin R and to consolidate the remaining particles. Optionally, a known infiltration process may be carried out during or after the sintering process, in order to fill voids in the component with a material having a lower melting temperature than the filler. The infiltration process improves component physical properties.

The turntable 20 can be operated such that the chamber 222 that is within the build zone 31 is moved to the unload zone 92 (and simultaneously, another chamber 222 is moved into the build zone 31). Then the used resin R is removed from the chamber 222 within the unload zone 92 by suitable apparatus such as a pump 93. The used resin R can be cleaned by filtering or other means and returned to the apparatus 10 to be reused. The turntable 20 is then operated to progress the chamber 222 from the unload zone 92 to the load zone 94.

As shown in FIG. 3, in the load zone 94 the material depositor 16 is operated to fill or load that chamber 222. After filling, the chamber 222 is moved from the load zone 94 to the build zone 31 and the cycle is repeated for that chamber 222. For those vats that have more than three chambers 222, a chamber 222 might not progress directly from zone 31, into zone 92, into zone 94, and then back into zone 31 as described above. In this manner, multiple chambers 222 can be used from a single vat 210 to produce multiple components 74 in alternating batch fashion. Utilization of the build zone 31 and the radiation apparatus 18 can be maximized while high quality clean resin is maintained. Optionally the chambers 222 can be filled with different resins R such that the components 74 is generated with multiple materials.

Figure 6:
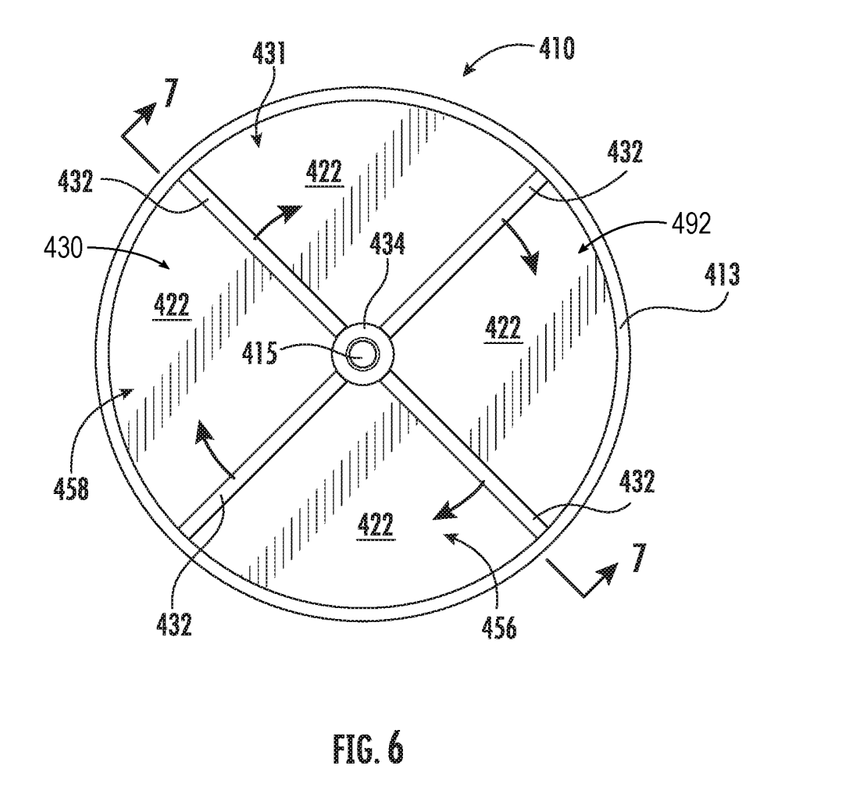
FIG. 6 is a view of another vat.
Figure 7:
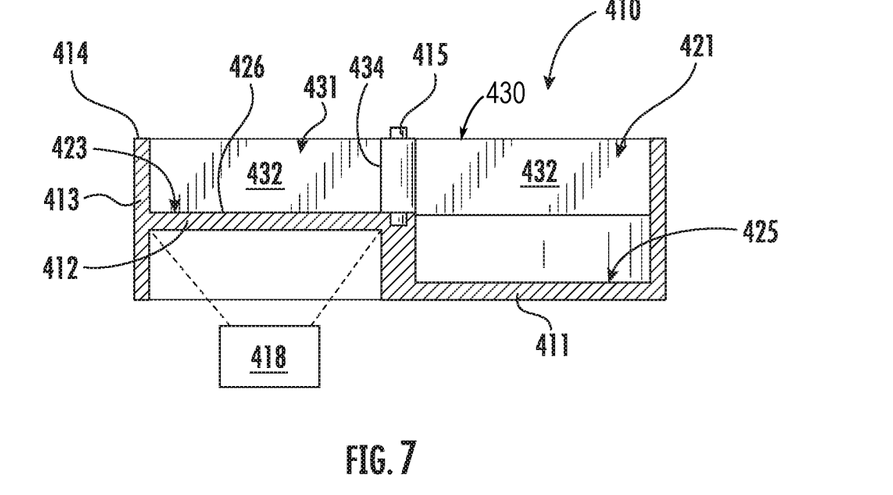
FIG. 7 is a cross-sectional view of the vat of FIG. 6.

Referring now to FIGS. 6 and 7 there is shown an alternative embodiment that includes a vat 410 that is configured to facilitate separation of clean resin from debris. Reference numbers in the 400 series refer to components that are similar to and can be understood from components described above associated with similar reference numbers in the 200 series described above. The vat 410 is generally circular and includes a floor 412, a perimeter wall 413, and a centrally located post 415. The perimeter wall 413 extends from the floor 412 to a top edge 414. Inner surfaces of the floor 412 and the perimeter wall 413 define a receptacle 421 for receiving the radiant-energy-curable resin R.

Within the receptacle 421, the floor 412 is configured with two or more different levels, such that the receptacle includes a working area 423 and a sump 425. Within the working area 423, the floor 412 defines a build surface 426. Together with the apparatus 18, the build surface 426 can define a build zone 431. As shown in FIG. 7, section 411 of the floor 412 defines the floor of the sump 425.

The working area 423 has a first depth relative to the top edge 414 of the perimeter wall 413. The sump 425 that has a second depth relative to the top edge 414. The second depth is greater than the first depth. The sump 425 is configured to receive solids such as cured resin and other debris that are swept into it, as will be described below. In the illustrated example, the sump 425 occupies one-quarter of the circular area of the receptacle.

A divider 430 is positioned within the receptacle 421. It includes a central hub 434 mounted for rotation about the post 415, and arms 432 radiating from the central hub 434. Four arms 432 are shown in this example. As see in FIG. 7, the bottom edges of the arms 432 ride on the floor 412 within the working area 423, leaving the sump 425 open below them. The arms 432 can be configured such that they are spaced apart from the floor 412 in the working area 423 such that debris can be moved by the arms 432 without the arms 432 contacting the floor. The arms 432 can be configured with a flexible bottom edge such that they effect a wiping action on the floor 412 in the working area 423. The divider 430 may be coupled to a suitable actuator (not shown) for rotation.

The arms 432 functionally divide the receptacle 421 into a plurality of chambers 422. The chambers 422 are generally analogous to the chambers 222 except that the shape and volume of the chambers 422 are determined by where they are positioned within the receptacle 421. It should be noted that in some embodiments, the arms 432 are not evenly distributed about the hub 434.

When a chamber 422 is entirely in the build zone 431 of the receptacle 421, the depth of that chamber 422 is equal to the depth of the build zone 431. When a chamber 422 is entirely in the sump area 425, the depth of that chamber 422 is defined by the depth of the sump area 425.

Proceeding in a clockwise direction in FIG. 6, the sump 425 and the associated chamber 422 lie within an unload zone 492 similar to unload zone 92 described above. Continuing to proceed in a clockwise direction, a fill zone 456 that is accessible by a material depositor (see item 16, FIG. 1) follows the unload zone 492. The load zone 456 is followed by a ready zone 458, which immediately proceeds the build zone 431 in sequence.

The vat 410 can be better understood by a description of the operation thereof. Resin R contained within the chamber 422 in the build zone 431 is cured in a curing step as described above. After completion of a layer, the divider 430 is rotated. The divider 430 is configured to pass over floor 412 such that debris is removed therefrom. Thus, rotating the divider 430 causes an arm 432 to sweep debris from the build zone 431 into the sump 425. The debris falls to the bottom of the sump 425 and is retained there until unloaded during an unloading step. An unloading step can occur for each curing step or can occur once per multiple curing steps.

Resin R is added to the load zone 456 in a loading step. It should be appreciated that a different resin R can be loaded into adjacent chambers 422. Such a method would result in adjacent layers containing different material, i.e., multi-material between layers. The loading step can occur concurrently with a curing step and an unloading step. Clean and ready to use resin is contained within the ready zone 458. Rotation of the divider 430 brings this clean resin into the build zone 431 for use during a subsequent curing step.

Figure 8:
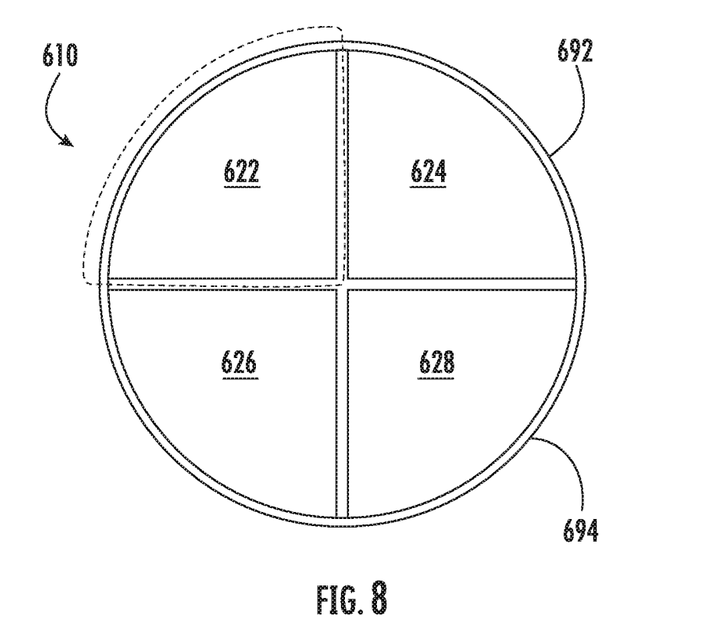
FIG. 8 is a view of a vat that includes multiple resin chambers and a stage cleaning chamber.

In an alternative embodiment, see in FIG. 8, there is provided a vat 610 that is substantially similar to vat 210 described above and that includes four chambers: a first chamber 622, a second chamber 624, a third chamber 626 and a fourth chamber 628 for stage cleaning. The vat 610 is configured for cleaning the component 74 and/or the stage to remove uncured resin R, debris, or contaminants between curing steps in a stage cleaning step. The first chamber 622, the second chamber 624, and the third chamber 626 are resin chambers that are configured to receive resin. The cleaning chamber 628 of the vat 610 is configured to receive a cleaning fluid.

The stage cleaning process may be used for the purpose of removing resin R that did not cure or resin R that did not cure enough to gel during the selective curing step described above. For example, it might be desired to clean the component 74 and/or the stage 14 to ensure that no additional material or material contamination is present in the final component 74. For example, cleaning could be done by contacting the component 74 and/or the stage 14 with the cleaning fluid such as a liquid detergent or solvent.

The operation of the vat 610 can be better understood through the following exemplary sequence of alternating curing steps and stage cleaning steps. The curing steps and the stage cleaning steps occur in the build zone 631. The turntable 20 is operated to position a predetermined chamber 622, 624, 626, and 628 in the build zone 631 by the turntable 20 in accordance with instructions from the controller 68.

Figure 9:
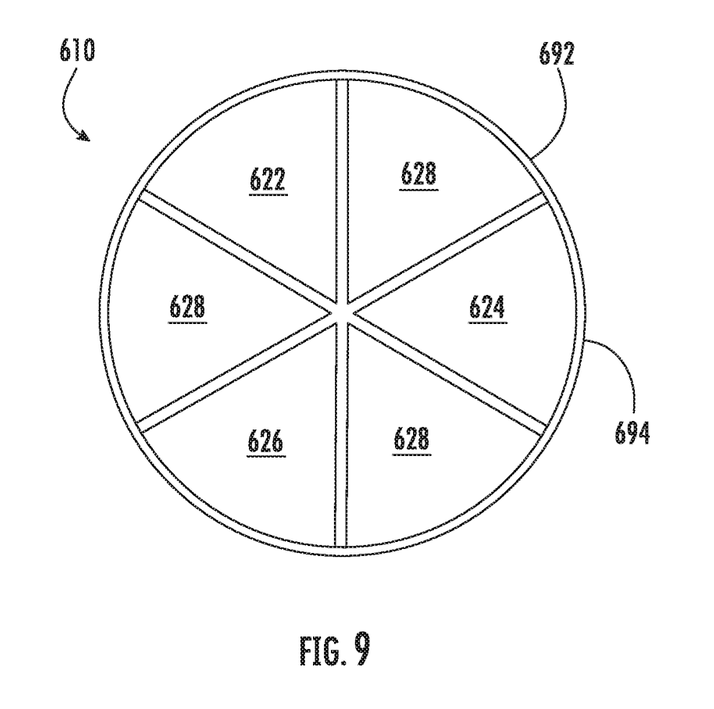
FIG. 9 is a view of a vat that includes multiple resin chambers and multiple cleaning chambers.

During each curing step, a predetermined one of the chambers 622, 624, and 626 is positioned in the build zone 631. During each cleaning step, the cleaning chamber 628 is positioned in the build zone 631. Parallel loading and unloading operations can be conducted of the chambers 622, 624, and 626 in the appropriate loading or unloading zone. It should be appreciated that one cleaning chamber 628 in a vat 610 is an efficient use of materials and equipment. However, such a configuration can result in operational inefficiencies such as the inability to conduct parallel loading and unloading operations in some cleaning and/or curing steps. Therefore vats 610 can be provided where a cleaning chamber 628 is positioned between adjacent chambers 622, 624, and 626 as shown in FIG. 9. Such a configuration can result in better operational utilization but might not be as efficient use of materials and equipment.

During a stage cleaning step, the stage 14 would then be lowered to bring the component 74 into contact with the cleaning fluid. Upon completion of the cleaning cycle, the stage 14 would then be raised to move the component 74 clear of the cleaning chamber 628.

Figure 10:
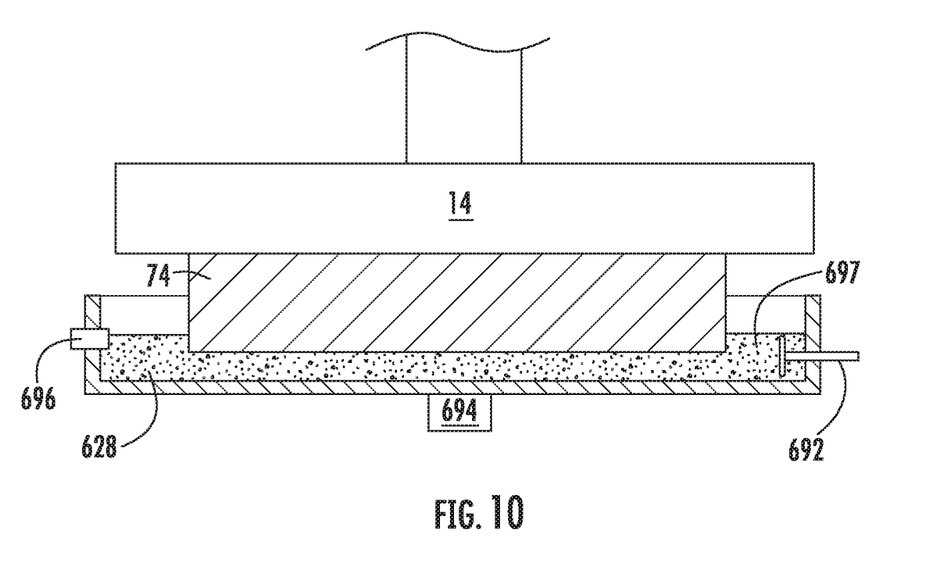
FIG. 10 is a schematic sectioned side elevation view showing a component being cleaned.

Optionally, the cleaning process may include the introduction of some type of relative motion between the cleaning fluid 697 and the component 74. FIG. 10 illustrates several different possible means for producing this relative motion. As one example, a mechanical mixing blade 692 may be used to agitate the cleaning fluid 697. As another example, an ultrasonic transducer 694 coupled to the cleaning chamber 628 may be used to produce ultrasonic waves in the cleaning fluid 697. As another example, one or more nozzles 696 may be used to introduce jets of flowing cleaning fluid 697. As yet another example, appropriate actuators (not shown) may be used to produce relative motion of the stage 14 and the cleaning chamber 628.

Figure 11:
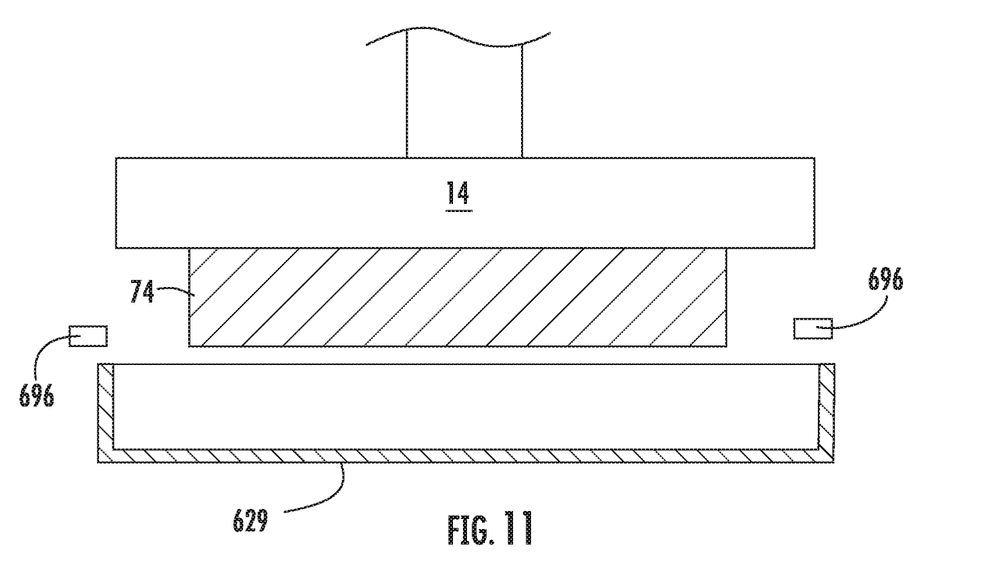
FIG. 11 is a schematic side elevation view showing a component being dried after a cleaning step

Optionally, the cleaning process can include a "drying" step in which air nozzles 392 (FIG. 11) would be used to direct jets of air at the freshly cleaned component 74 for the purpose of blowing off or evaporating the cleaning fluid. Depending on the particular circumstances, the "drying" step may be sufficient to clean the component 74 in and of itself. Prior to the drying step, the stage 14 would be moved such that the component 74 is removed from cleaning fluid 697 that is in the cleaning chamber 628. The component 74 is dried while it is positioned above an empty chamber 629 as shown in FIG. 11. Optionally, the component 74 is dried while it is positioned above the cleaning chamber 628 such that residual cleaning fluid 697 can fall from the component 74 into the cleaning chamber 628.

The method described herein has several advantages over the prior art. In particular, it eliminates a major pathway for build failures in vat-based photopolymerization. It also potentially has lower cost, less material waste, and higher process speed compared to prior art tape casting methods.

The foregoing has described a method and apparatus for additive manufacturing. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. An additive manufacturing apparatus, comprising:
   a vat that includes multiple chambers and at least one of the chambers is a resin chamber that is configured to receive a radiant-energy-curable resin, the vat defining a receptacle and a divider that is positioned within the receptacle, the divider defining the multiple chambers within the receptacle;
   a build surface defined by the resin chamber within the vat, wherein at least a portion of the build surface is transparent;
   a stage positioned facing the vat and the build surface and the stage is configured to hold a stacked arrangement of one or more cured layers of the radiant-energy-curable resin;
   one or more actuators operable to change the relative positions of the vat and the stage; and
   a radiant energy apparatus positioned adjacent to the vat opposite to the stage, and operable to generate and project radiant energy on the radiant-energy-curable resin through a floor of the vat in a predetermined pattern when the resin is in a build zone,
   wherein the divider is configured to move within the receptacle such that the defined chambers move relative to the stage.

2. The apparatus of claim 1 wherein at least two chambers are resin chambers.

3. The apparatus of claim 2 wherein at least one chamber is a cleaning chamber that is configured to receive a cleaning fluid.

4. The apparatus of claim 3 wherein the chambers within the vat are radially distributed around the vat.

5. The apparatus of claim 4 wherein the resin chambers are separated by cleaning chambers.

6. The apparatus of claim 1, comprising a load zone and an unload zone such that a chamber can move between the build zone, the load zone, and the unload zone.

7. The apparatus of claim 6, comprising a moving mechanism for moving the vat.

8. The apparatus of claim 7 wherein the moving mechanism includes a turntable.

9. The apparatus of claim 8 wherein the divider is configured to rotate about an axis defined by vat such that the chambers move between the build zone, an unload zone, and a cleaning zone.

10. The apparatus of claim 9 wherein the receptacle includes a sump.

11. The apparatus of claim 10 wherein the divider is configured to rotate such that each chamber passes over the sump and the divider is configured to pass over the build surface such that debris from the build surface accumulates in the sump.

* * * * *